(12) United States Patent
Zhi et al.

(10) Patent No.: US 9,780,876 B2
(45) Date of Patent: Oct. 3, 2017

(54) RELAY SUPPORTED METHOD, SYSTEM, AND RELAY NODE FOR TRANSMITTING VISIBLE LIGHT INFORMATION

(71) Applicant: ZTE Corporation, Shenzhen, Guangdong (CN)

(72) Inventors: Zhou Zhi, Shenzhen (CN); Chen Lu, Shenzhen (CN); Lin Chen, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/895,905

(22) PCT Filed: Aug. 16, 2013

(86) PCT No.: PCT/CN2013/081662
§ 371 (c)(1),
(2) Date: Dec. 3, 2015

(87) PCT Pub. No.: WO2013/189349
PCT Pub. Date: Dec. 27, 2013

(65) Prior Publication Data
US 2016/0112127 A1    Apr. 21, 2016

(30) Foreign Application Priority Data

Jun. 3, 2013   (CN) .......................... 2013 1 0216556

(51) Int. Cl.
*H04B 10/00*     (2013.01)
*H04B 10/116*    (2013.01)

(52) U.S. Cl.
CPC ................... *H04B 10/116* (2013.01)

(58) Field of Classification Search
USPC ................................ 398/118, 126, 130, 173
See application file for complete search history.

(56) References Cited

U.S. PATENT DOCUMENTS 7,688,680 B1 *  3/2010  Gunasekara ........... H04B 11/00
                                                    367/134
8,503,886 B1 *  8/2013  Gunasekara ......... H04B 10/116
                                                    398/115

(Continued)

FOREIGN PATENT DOCUMENTS

CN    101771457 A    7/2010
CN    201742416 U    2/2011

(Continued)

OTHER PUBLICATIONS

International Search Report in international application No. PCT/CN2013/081662, mailed on Mar. 6, 2014.

(Continued)

*Primary Examiner* — David Payne
*Assistant Examiner* — Pranesh Barua
(74) *Attorney, Agent, or Firm* — Oppedahl Patent Law Firm LLC (57) ABSTRACT

A relay supported method, system, and a RN for transmitting visible light information are provided. The method includes that UE sends information to a detected RN, and the RN processes and forwards the information from the UE to a VS. The RN is configured to process and forward the information from the UE to the VS in an uplink direction. According to the present disclosure, with adoption of visible light communication relay, visible light communication coverage may be broadened, and a visible light communication rate may be increased.

6 Claims, 3 Drawing Sheets

(56) References Cited

U.S. PATENT DOCUMENTS

| | | | | |
|---|---|---|---|---|
| 8,798,617 | B1* | 8/2014 | Cole | H04W 8/005 455/404.2 |
| 2003/0218990 | A1* | 11/2003 | Tung | H04B 7/15557 370/279 |
| 2010/0103869 | A1* | 4/2010 | Naden | H04W 92/20 370/328 |
| 2011/0116803 | A1* | 5/2011 | Sone | H04Q 11/0067 398/98 |
| 2012/0113834 | A1* | 5/2012 | Hunzinger | H04B 7/15535 370/252 |
| 2012/0202512 | A1* | 8/2012 | Braithwaite | H04W 52/267 455/452.2 |
| 2013/0028599 | A1* | 1/2013 | Sone | H04J 14/0282 398/37 |
| 2014/0112656 | A1* | 4/2014 | Yamashita | H04L 12/44 398/16 |
| 2014/0226977 | A1* | 8/2014 | Jovicic | H04B 10/116 398/26 |
| 2014/0375982 | A1* | 12/2014 | Jovicic | G01B 11/14 356/72 |
| 2015/0103731 | A1* | 4/2015 | Jeon | H04J 11/00 370/315 |

FOREIGN PATENT DOCUMENTS

| | | |
|---|---|---|
| CN | 102624455 A | 8/2012 |
| CN | 102694594 A | 9/2012 |
| CN | 203206245 U | 9/2013 |
| JP | 4793685 B2 | 10/2011 |

OTHER PUBLICATIONS

English Translation of the Written Opinion of the International Search Authority in international application No. PCT/CN2013/081662, mailed on Mar. 6, 2014.

Supplementary European Search Report in European application No. 13807442.2, mailed on May 25, 2016.

"D0P802-15-7 Draft_ Standard", I EEE Draft; D0P802-15-7_DRAFT_STANDARD,IEEE-SA, Piscataway, NJ USA,vol. 802 . 15 . 7 ,Dec. 10, 2009 (Dec. 10, 2009).pp. 1-286, XP017636050,mailed on Dec. 10, 2009.

* cited by examiner

RELAY SUPPORTED METHOD, SYSTEM, AND RELAY NODE FOR TRANSMITTING VISIBLE LIGHT INFORMATION

TECHNICAL FIELD

The present disclosure relates to a relaying technology, and in particular to a relay supported method for transmitting visible light information and system, as well as a Relay Node (RN).

BACKGROUND

Visible light communication, which belongs to a wireless communication technology, finishes information transmission by utilizing visible light with a frequency ranged from 400 THz (corresponding to a wavelength of 780 nm) to 750 THz (corresponding to a wavelength of 400 nm) as a communication medium.

As a wireless access technology, visible light communication transmits information by a Light-Emitting Diode (LED) visible light signal, and the most prominent feature of visible light communication is its combination with an LED illumination technology having the reputation of "green illumination", which provides electromagnetic interference-free high-speed information flow transmission while providing illumination and solves the problems of narrow frequency band and electromagnetic interference of a broadband wireless system.

In an existing wireless communication system, relaying mainly functions to broaden coverage of a cell, provide a service signal for an area with serious shadow fading in the cell and a dead zone in the coverage and provide coverage of a hot spot, indoor coverage and the like. It is also necessary for information transmission which is performed by visible light communication to utilize a relaying technology in scenarios that the rate and coverage of visible light communication are limited, but there is yet no specific solution to such a condition.

SUMMARY

In view of this, the embodiments of the present disclosure are intended to provide a relay supported method, system and an RN for transmitting visible light information, which may broaden light communication coverage and increase a visible light communication rate by visible light communication relay.

To this end, the technical solutions of the present disclosure are implemented as follows.

A relay supported method for transmitting visible light information is provided, in which information is transmitted by a light signal for visible light communication, the method includes that:

User Equipment (UE) sends information to a RN which is detected by the UE; and the RN processes the information from the UE and forwards the processed information to a visible service node (VS).

The RN specifically may be a RN of layer-1 relay type or a RN of layer-2 relay type;

the step that the RN processes the information from the UE may specifically include that: different types of RNs performs different processing on the information from the UE.

When the RN is the RN of layer-1 relay type, processing the information from the UE may include: amplifying and forwarding a received light signal and continuing transmitting the information which adopts the light signal for communication;

when the RN is the RN of layer-2 relay type, processing the information from the UE may include: decoding a received light signal, recoding the decoded light signal according to a channel condition between the RN and the UE, forwarding the recoded light signal and continuing transmitting the information which adopts the recoded light signal for communication.

The method may further include that when the UE simultaneously communicates with the RN and the VS, the UE forwards the information to the VS through the RN, and the UE directly sends the information to the VS.

The method may further include that when information transmission rates of a transmission link between the UE and the RN and a transmission link between the RN and the VS are different, an information flow having a high transmission rate, which is transmitted over any one of the two transmission links, is buffered at the RN.

A relay supported method for transmitting visible light information is provided, in which information is transmitted by a light signal for visible light communication, the method includes:

a VS sends information to a RN which is detected by the VS; and the RN processes the information from the VS and forwards the processed information to UE.

The RN may specifically be a RN of layer-1 relay type or a RN of layer-2 relay type;

the step that the RN processes the information from the VS may specifically include: different types of RNs process the information from the VS in different ways.

When the RN is the RN of layer-1 relay type, processing the information from the VS may specifically include: amplifying and forwarding a received light signal and continuing transmitting the information which adopts the received light signal for communication;

when the RN is the RN of layer-2 relay type, processing the information from the VS may specifically include: decoding a received light signal, recoding the decoded light signal according to a channel condition between the RN and the VS, forwarding the recoded light signal and continuing transmitting the information which adopts the recoded light signal for communication.

The method may further include: when the VS simultaneously communicates with the RN and the UE, the VS directly sends the information to the UE, and the VS forwards the information to the UE through the RN.

The method may further include: when information transmission rates of a transmission link between the VS and the RN and a transmission link between the RN and the UE are different, an information flow having a high transmission rate, which is transmitted over any one of the two transmission links, is buffered at the RN.

An RN is provided, which is configured to process information from UE and forward the processed information to a VS in an uplink direction.

The RN may include:

a receiving unit, configured to receive and forward a light signal from the UE to a first baseband processing unit, wherein the light signal is for transmitting the information;

the first baseband processing unit, configured to decode the received light signal to obtain the information and forward the information to a processor for processing;

the processor, configured to forward the information to a second baseband processing unit;

the second baseband processing unit, configured to code the received information to obtain an electric signal and forward the electric signal to a light modulation unit;

the light modulation unit, configured to convert the received electric signal into a light signal and forward the light signal to a sending unit; and the sending unit, configured to forward the received light signal to the VS, wherein the received light signal is for transmitting the information.

The receiving unit may be specifically a receiver, the sending unit may be specifically a sender, and each of the first baseband processing unit, the second baseband processing unit, the processor and the light modulation unit may be implemented by a Central Processing Unit (CPU), a Digital Signal Processor (DSP) or a Field-Programmable Gate Array (FPGA).

The RN may further include a data buffer unit, configured to interact with the processor and buffer a high-speed information flow from the processor; the data buffer unit may be specifically a memory; and the processor may be further configured to provide the high-speed information flow among information flows for the data buffer unit for buffering when detecting that information flow transmission rates of a transmission link between the UE and the RN and a transmission link between the RN and the VS are different, and configured to extract the high-speed information flow from the data buffer unit and forward the high-speed information flow to the second baseband processing unit when detecting that the transmission link with higher information flow transmission rate is idle.

An RN is provided, which is configured to process information from a VS and forward the processed information to UE in a downlink direction.

The RN may include:

a receiving unit, configured to receive and forward a light signal from the VS to a first baseband processing unit, wherein the light signal is for transmitting the information;

the first baseband processing unit, configured to decode the received light signal to obtain the information and forward the information to a processor for processing;

the processor, configured to forward the information to a second baseband processing unit;

the second baseband processing unit, configured to code the received information to obtain an electric signal and forward the electric signal to a light modulation unit;

the light modulation unit, configured to convert the received electric signal into a light signal and forward the light signal to a sending unit; and the sending unit, configured to forward the received light signal to the UE, wherein the received light signal is for transmitting the information.

The receiving unit may be specifically a receiver, the sending unit may be specifically a sender, and each of the first baseband processing unit, the second baseband processing unit, the processor and the light modulation unit may be implemented by a CPU, a DSP or an FPGA.

The RN further may include a data buffer unit, configured to interact with the processor and buffer a high-speed information flow from the processor; the data buffer unit is specifically a memory; and the processor is further configured to provide the high-speed information flow among information flows for the data buffer unit for buffering when detecting that information flow transmission rates of a transmission link between the UE and the RN and a transmission link between the RN and the VS are different, and extract the high-speed information flow from the data buffer unit and forward the high-speed information flow to the second baseband processing unit when detecting that the transmission link with higher information flow transmission rate is idle.

A relay supported system for transmitting visible light information is provided, which includes UE and a VS, wherein the system further includes an RN, and the RN specifically includes any RN in an uplink direction and any RN in a downlink direction.

According to an embodiment of the present disclosure, information is transmitted by a light signal for visible light communication, and the method includes that UE sends information to a detected RN, and the RN processes the information from the UE and forwards the processed information to the VS.

According to the embodiment of the present disclosure, information is transmitted by a light signal, and the information is forwarded by a RN, so that loss caused by direct information transmission between UE and a VS may be avoided, in this way, according to in the embodiment of the present disclosure, the visible light communication coverage may be broadened and the visible light communication rate may be increased by visible light communication relay.

DETAILED DESCRIPTION

Implementation of the technical solutions is further described below with reference to the drawings in detail.

Figure 1:
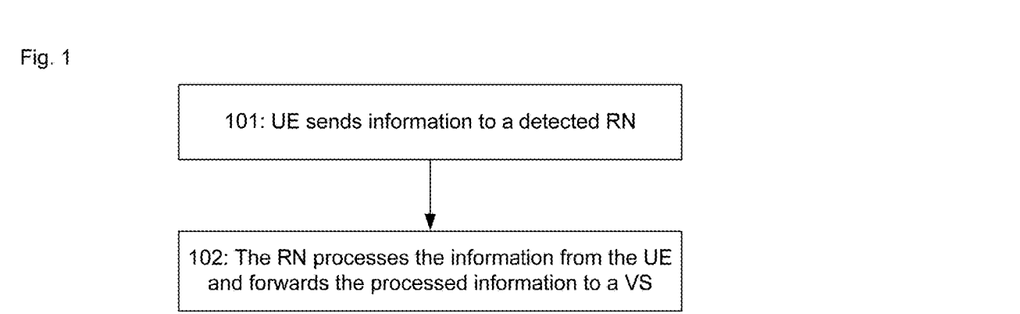
FIG. 1 is an uplink transmission diagram of a method according to an embodiment of the present disclosure.

For an uplink direction, a relay supported method for transmitting visible light information of the embodiment of the present disclosure is shown in FIG. 1, information is transmitted by visible light communication, that is, the information is transmitted by a light signal for visible light communication, and the method mainly includes the following steps:

Step 101: UE sends information to a detected RN; and

Step 102: the RN processes the information from the UE and forwards the processed information to a VS.

Here, the RN specifically may be a RN of layer-1 relay type or a RN of layer-2 relay type;

the step that the RN processes the information from the UE includes that: different types of RNs performs different processing on the information from the UE.

Here, when the RN is a RN of layer-1 relay type, processing the information from the UE includes: amplifying and forwarding a received light signal and continuing transmitting the information which adopts the received light signal for communication;

when the RN is a RN of layer-2 relay type, processing the information from the UE includes: decoding a received light signal, recoding the decoded light signal according to a channel condition between the RN and the UE, forwarding the recoded light signal and continuing transmitting the information which adopts the recoded light signal for communication.

Here, the method further includes: when the UE simultaneously communicates with the RN and the VS, the UE forwards the information to the VS through the RN, and the UE directly sends the information to the VS.

Here, the method further includes: when information transmission rates of a transmission link between the UE and the RN and a transmission link between the RN and the VS are different, the RN buffers an information flow (the information flow may be called a high-speed information flow hereinafter for short) transmitted over any one of the two transmission links.

Figure 2:
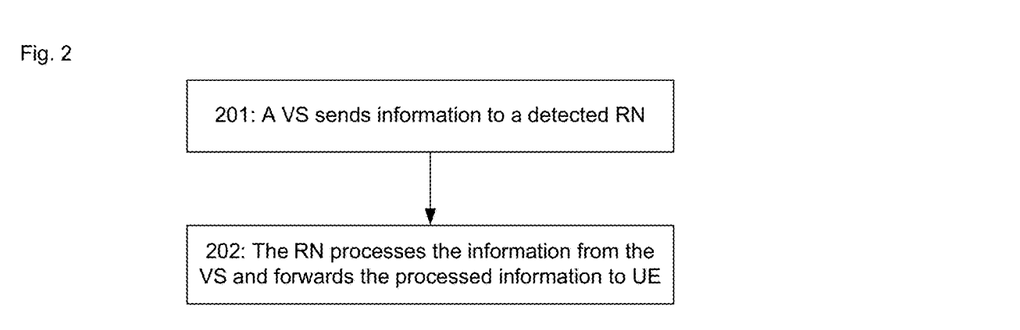
FIG. 2 is a downlink transmission diagram of a method according to an embodiment of the present disclosure.

For a downlink direction, a relay supported method for transmitting visible light information of the embodiment of the present disclosure is shown in FIG. 2, information is transmitted by virtue of visible light communication, that is, the information is transmitted by a light signal for visible light communication, and the method mainly includes the following steps:

Step 201: a VS sends information to a detected RN; and

Step 202: the RN processes the information from the VS and forwards the processed information to UE.

Here, the RN specifically may be a RN of layer-1 relay type or a RN of layer-2 relay type;

the step that the RN processes the information from the VS is specifically as follows: different types of RNs process the information from the VS in different ways.

Here, when the RN is a RN of layer-1 relay type, processing the information from the VS specifically includes: amplifying and forwarding a received light signal and continuing transmitting the information which adopts the received light signal for communication;

when the RN is a RN of layer-2 relay type, processing the information from the VS specifically includes: decoding a received light signal, recoding the decoded light signal according to a channel condition between the RN and the VS, forwarding the recoded light signal and continuing transmitting the information which adopts the recoded light signal for communication.

Here, the method further includes: when the VS simultaneously communicates with the RN and the UE, the VS directly sends the information to the UE, and the VS forwards the information to the UE through the RN.

Here, the method further includes: when information transmission rates of a transmission link between the VS and the RN and a transmission link between the RN and the UE are different, the RN buffers an information flow having a high transmission rate value (the information flow may be called a high-speed information flow hereinafter for short), which is transmitted over any one of the two transmission links.

For the uplink direction, an RN of the embodiment of the present disclosure is configured to process information from UE and forward the processed information to a VS in the uplink direction.

Here, the RN includes:

a receiving unit, configured to receive and forward a light signal from the UE to a first baseband processing unit, wherein the light signal is for transmitting the information;

the first baseband processing unit, configured to decode the received light signal to obtain the information and forward the information to a processor for processing;

the processor, configured to forward the information to a second baseband processing unit;

the second baseband processing unit, configured to code the received information to obtain an electric signal and forward the electric signal to a light modulation unit;

the light modulation unit, configured to convert the received electric signal into a light signal and forward the light signal to a sending unit; and the sending unit, configured to forward the received light signal to the VS, the received light signal being for transmitting the information.

Here, the RN further includes a data buffer unit, configured to interact with the processor and buffer a high-speed information flow from the processor;

the processor is further configured to provide the high-speed information flow among information flows for the data buffer unit for buffering when detecting that information flow transmission rates of a transmission link between the UE and the RN and a transmission link between the RN and the VS are different, and extract the high-speed information flow from the data buffer unit and forward the high-speed information flow to the second baseband processing unit when detecting that the transmission link with higher information flow transmission rate is idle.

For the downlink direction, an RN of the embodiment of the present disclosure is configured to process information from a VS and forward the processed information to UE in the downlink direction.

Here, the RN includes:

a receiving unit, configured to receive and forward a light signal from the VS to a first baseband processing unit, the light signal being for transmitting the information;

the first baseband processing unit, configured to decode the received light signal to obtain the information and forward the information to a processor for processing;

the processor, configured to forward the information to a second baseband processing unit;

the second baseband processing unit, configured to code the received information to obtain an electric signal and forward the electric signal to a light modulation unit;

the light modulation unit, configured to convert the received electric signal into a light signal and forward the light signal to a sending unit; and the sending unit, configured to forward the received light signal to the UE, the light signal being configured to transmit the information.

Here, the RN further includes a data buffer unit, configured to interact with the processor and buffer a high-speed information flow from the processor; and the processor is further configured to provide the high-speed information flow among information flows for the data buffer unit for buffering when detecting that information flow transmission rates of a transmission link between the UE and the RN and a transmission link between the RN and the VS are different, and extract the high-speed information flow from the data buffer unit and forward the high-speed information flow to the second baseband processing unit when detecting that the transmission link with higher information flow transmission rate is idle.

For the uplink direction, a relay supported system for transmitting visible light information of the embodiment of the present disclosure includes existing UE and VS, and the system further includes any RN for the uplink direction, as described above.

For the downlink direction, a relay supported system for transmitting visible light information of the embodiment of the present disclosure includes existing UE and VS, and the system further includes any RN for the downlink direction, as described above.

Corresponding to specific application scenarios, the entire uplink and downlink flow is included, and a relay supported system for transmitting visible light information of the embodiment of the present disclosure includes existing UE and VS, the system further includes an RN, and the RN specifically includes any RN for the uplink direction and any RN for the downlink direction, as described above.

The embodiment of the present disclosure is described below with specific examples.

Embodiment 1

Figure 3:
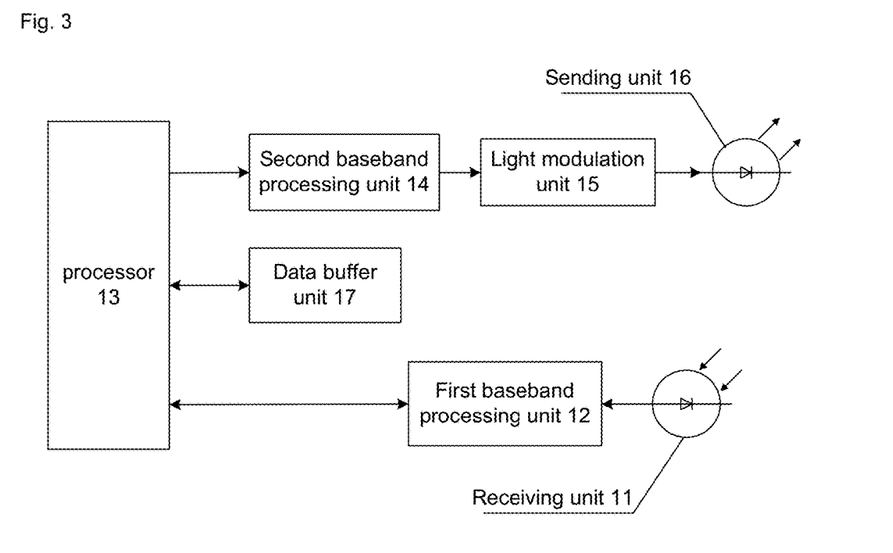
FIG. 3 is a structure diagram of an RN according to embodiment 1 of the present disclosure.

A structure of an RN is shown in FIG. 3, a visible light signal is received by a receiving unit 11, processed by a first baseband processing unit 12, forwarded to a processor 13, forwarded to a second baseband processing unit 14 by the processor 13 and forwarded to a sending unit 16 after being modulated by a light modulation unit 15. When transmission rates of information flows on a transmission link between UE for visible light communication and the RN for visible light communication and on a transmission link between the RN for visible light communication and a VS for visible light communication are different, a data buffer unit 17 stores the high-speed information flow to implement information transmission between low-speed link equipment within an idle period by virtue of the high-speed information flow transmission link.

Embodiment 2

Figure 4:
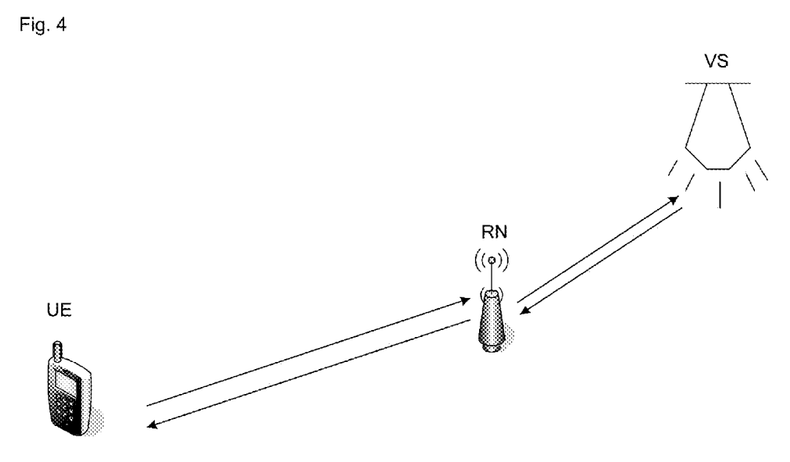
FIG. 4 is a diagram of system topology structure-based information transmission according to embodiment 2 of the present disclosure.

A system architecture shown in FIG. 4 includes a service node (called VS for short) for visible light communication, a relay node (called RN for short) for visible light communication and a terminal node (called UE for short) for visible light communication. Information sent by the UE is forwarded through the RN, and is transmitted through a single transmission path in each of an uplink direction and a downlink direction, and a communication function is realized by the forwarding which is performed by the RN.

For each piece of equipment in the system, including the VS, the RN and the UE, the system pre-allocates a unique identification code for identifying each piece of equipment, and in such a manner, for information sent by each piece of equipment, the receiving equipment may identify the current equipment according to the unique identification code allocated to each piece of equipment, that is, sources of the information transmitted by light signals may be distinguished according to the identification codes, wherein the identification codes may be contained in the information transmitted by light signals, and the receiving equipment may obtain the identification codes by decoding, so that a judgment about whether the information which is received by the receiving equipment and transmitted by the light signals is from the VS, the RN or the UE may be made.

An uplink signal sending process includes the following contents:

a1: UE detects a RN.

b1: The UE sends information transmitted by virtue of a light signal to the RN.

c1: The RN receives the information from the UE, and performs corresponding processing, different types of RNs performing different types of processing.

Here, different types of RNs perform different types of processing because there are many types of RNs, for example, a layer-1 relay type and a layer-2 relay type. When the type of the RN is the layer-1 relay type, the RN, which realizes functions of visible light signal amplification and information transmission continuation, only performs simple forwarding, namely amplifying and forwarding a received signal. Such an RN is of a simple relay type, the advantage is low time delay introduced by the RN in a relaying process, and the shortcoming is that noise and interference signals may be amplified at the same time when the signal is amplified; and when the RN is of the layer-2 relay type, the RN decodes the received signal, then recodes the decoded signal according to a channel condition between the RN and the UE, and then forwards the recoded signal. Such recoding includes selecting a physical-layer signal format such as a modulation manner and a coding manner. Such a relay node has the advantage that with adoption of the RN, signal transmission accuracy and signal transmission efficiency can be improved; and the shortcoming is that a time delay may be caused when the RN decodes and recodes signals.

d1: The RN sends the information to the VS.

e1: The VS receives the information from the RN.

A downlink signal sending process includes the following contents:

1: a VS detects a RN;

2: the VS sends information to the RN;

3: the RN receives the information from the VS, and performs corresponding processing, different types of RNs performing different types of processing;

4: the RN sends the information to the UE;

5: the UE receives the information from the RN.

Embodiment 3

Figure 5:
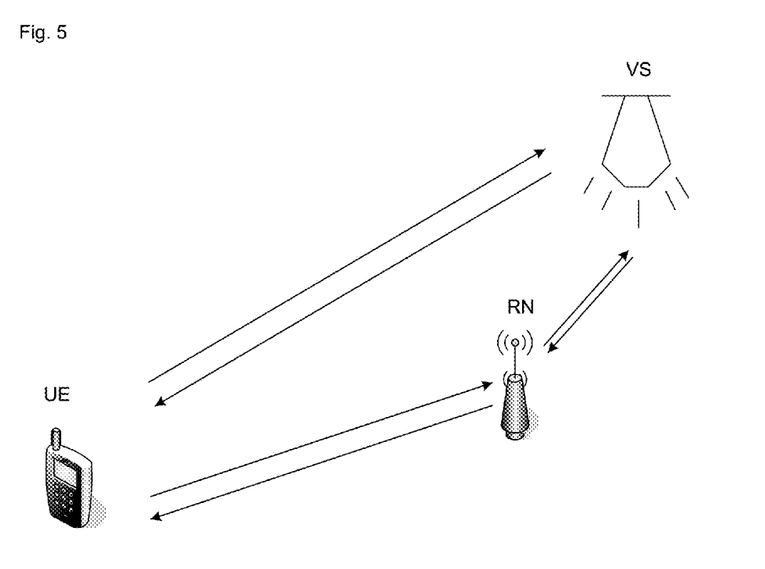
FIG. 5 is a diagram of system topology structure-based information transmission according to embodiment 3 of the present disclosure.

A system architecture shown in FIG. 5 includes a VS for visible light communication, an RN for visible light communication and UE for visible light communication. Information sent by the UE is forwarded through the RN. The UE may simultaneously send the information to the VS through the RN and directly send the information to the VS, that is, the information may be transmitted through two transmission paths in an uplink direction and a downlink direction, and the VS receives/sends the information through two information links, which may effectively improve communication reliability and increase an information rate.

For each piece of equipment in the system, including the VS, the RN and the UE, the system pre-allocates a unique identification code for identifying each piece of equipment, and in such a manner, for information sent by each piece of equipment, the receiving equipment may identify the current equipment according to the unique identification code allocated to each piece of equipment, that is, sources of the information transmitted by light signals may be distinguished according to the identification codes, the identification codes may be contained in the information transmitted by the light signals, and the receiving equipment may obtain the identification codes by decoding, so that a judgment about whether the information which is received by the receiving equipment and transmitted by the light signals is from the VS, the RN or the UE may be made.

In uplink and downlink processes, except communication between the UE and the VS, a manner of forwarding the information through the RN refers to similar description in embodiment 2, and will not be repeated here.

Figure 6:
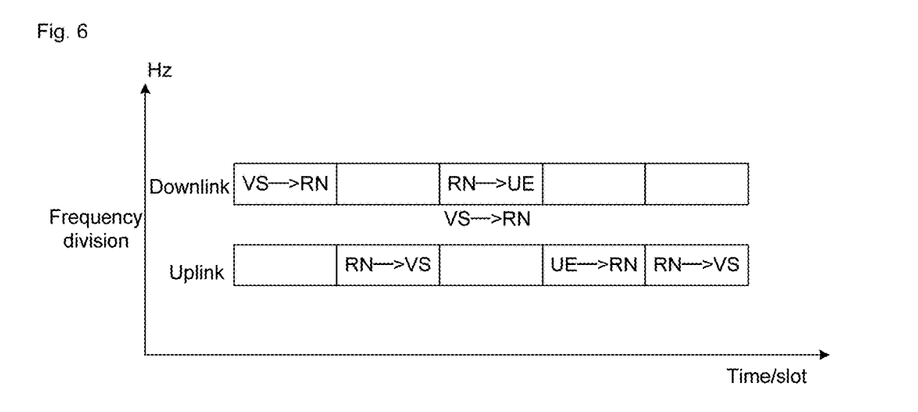
FIG. 6 is a diagram of a frame format of each node according to an embodiment of the present disclosure.
Figure 7:
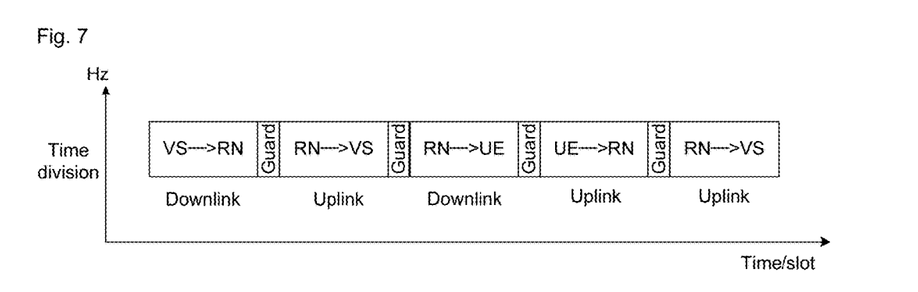
FIG. 7 is a diagram of another frame format of each node according to an embodiment of the present disclosure.

It is important to point out here that: visible light signal interference may be produced between signal sending and receiving of the RN after the RN is adopted, and in order to solve the problem, information is sent in a frequency division manner or a time division manner in the embodiment of the present disclosure, a frame structure is shown in FIG. 6 and FIG. 7, information is sent by taking a slot as a unit, and a frame structure according to the embodiment of the present disclosure may effectively avoid interference between uplink and downlink signals.

For the frequency division manner, the frame structure is shown in FIG. 6, different visible light frequency bands are adopted for uplink and downlink directions, and the information is sent at different slots in the uplink and downlink directions, so that interference between the uplink and downlink is avoided. Here, the uplink and downlink timeslot lengths for transmission may be configured on the basis of an adopted visible light communication system.

For the time division manner, the frame structure is shown in FIG. 7, the same visible light frequency band is adopted, and different uplink and downlink signals are sent at different slots for uplink transmitted information and downlink transmitted information. A guard band interval is set between signals, which may avoid interference between different information.

Application example 1: a scenario where automobiles on a road implement relaying transmission of information by attached light sources of the automobiles.

An uplink sending process includes the following contents:

1: automobile A discovers automobile B which may serve as an RN;

2: automobile A sends a visible light signal to automobile B;

3: automobile B (the RN) sends the signal to a traffic light (a VS); and

4: the VS receives the visible light signal forwarded by automobile B.

A downlink sending process is an inverse process of the uplink sending process, and will not be repeated. A signal sent by the VS is forwarded to automobile A through the RN (automobile B).

Application example 2: a scenario where miners in a mine implement relaying transmission of information by headlamps.

An uplink sending process includes the following contents:

1: visible light communication equipment headlamp of miner A discovers visible light communication equipment, which may serve as an RN, of miner B;

2: the visible light communication equipment headlamp of miner A sends a visible light signal to miner B;

3: miner B (the RN) sends the signal to a VS; and

4: the VS receives the visible light signal forwarded by miner B.

A downlink sending process is an inverse process of the uplink sending process, and will not be repeated. A signal sent by the VS is forwarded to miner A through the RN (miner B).

The above is only the preferred embodiment of the present disclosure and not intended to limit the scope of protection of the present disclosure.

INDUSTRIAL PRACTICABILITY

According to the embodiments of the present disclosure, information is transmitted by a light signal, and the information is forwarded by an RN, so that loss caused by direct information transmission between UE and a VS may be avoided; and therefore, with adoption of visible light communication relay in the embodiment of the present disclosure, visible light communication coverage may be broadened and a visible light communication rate may be increased.

The invention claimed is:

1. A relay supported method for transmitting visible light information, information being transmitted by a light signal for visible light communication, the method comprising:

receiving, by a receiving unit of a Relay Node (RN), the light signal from a User Equipment (UE), and forwarding the received light signal to a first baseband processing unit of the RN;

decoding, by the first baseband processing unit, the received light signal to obtain the information from the UE, forwarding the information to a processor of the RN for processing;

forwarding, by the process of the RN, the information to a second baseband processing unit of the RN;

coding, by the second baseband processing unit of the RN, the information to obtain an electric signal and forwarding the electric signal to a light modulation unit of the RN;

converting, by the light modulation unit of the RN, the received electric signal into a light signal and forwarding the light signal to a sending unit of the RN; and forwarding, by the sending unit of the RN, the received light signal to a visible service node (VS); wherein buffering, by a data buffer unit of the RN, a high-speed information flow among information flows provided by the processor of the RN when the processor of the RN detects that information flow transmission rates of a transmission link between the UE and the RN and a transmission link between the RN and the VS are different, and forwarding, by the processor of the RN, the high-speed information flow extracted from the data buffer unit of the RN to the transmission link with lower information flow transmission rate when detecting that the transmission link with higher information flow transmission rate is idle.

2. The method according to claim 1, further comprising: when
the UE simultaneously communicates with the RN and the VS, forwarding, by the UE, the information to the VS through the RN, and directly sending, by the UE, the information to the VS.

3. A relay supported method for transmitting visible light information, information being transmitted by a light signal for visible light communication, the method comprising:

receiving, by a receiving unit of a Relay Node (RN), the light signal from a Visible service node (VS); and forwarding the received light signal to a first baseband processing unit of the RN;

decoding, by the first baseband processing unit of the RN, the received light signal to obtain the information from the VS, forwarding the information to a processor of the RN for processing;

forwarding, by the process of the RN, the information to a second baseband processing unit of the RN;

coding, by the second baseband processing unit of the RN, the information to obtain an electric signal and forwarding the electric signal to a light modulation unit of the RN;

converting, by the light modulation unit of the RN, the received electric signal into a light signal and forwarding the light signal to a sending unit of the RN; and forwarding, by the sending unit of the RN, the received light signal to User Equipment (UE);

wherein buffering, by a data buffer unit of the RN, a high-speed information flow among information flows provided by the processor of the RN when the processor of the RN detects that information flow transmission rates of a transmission link between the UE and the RN and a transmission link between the RN and the VS are different, and forwarding, by the processor of the RN, the high-speed information flow extracted from the data buffer unit of the RN to the transmission link with lower information flow transmission rate when detecting that the transmission link with higher information flow transmission rate is idle.

4. The method according to claim 3, further comprising: when the VS simultaneously communicates with the RN and the UE, directly sending, by the VS, the information to the UE, and forwarding, by the VS, the information to the UE through the RN.

5. A Relay Node (RN), configured to process information from User Equipment (UE) and forward the processed information to a visible service node (VS) in an uplink direction;

wherein the RN comprising a receiving unit, configured to receive and forward a light signal from the UE to a first baseband processing unit, wherein the light signal is for transmitting the information;

the first baseband processing unit, configured to decode the received light signal to obtain the information and forward the information to a processor for processing;

the processor, configured to forward the information to a second baseband processing unit;

the second baseband processing unit, configured to code the received information to obtain an electric signal and forward the electric signal to a light modulation unit;

the light modulation unit, configured to convert the received electric signal into a light signal and forward the light signal to a sending unit; and the sending unit, configured to forward the received light signal to the VS, wherein the received light signal is for transmitting the information;

the RN further comprising a data buffer unit, configured to interact with the processor and buffer a high-speed information flow from the processor, wherein the processor is further configured to provide the high-speed information flow among information flows for the data buffer unit for buffering when detecting that information flow transmission rates of a transmission link between the UE and the RN and a transmission link between the RN and the VS are different, and configured to extract the high-speed information flow from the data buffer unit and forward the high-speed information flow to the second baseband processing unit when detecting that the transmission link with higher information flow transmission rate is idle.

6. A Relay Node (RN), configured to process information from a visible service node (VS) and forward the processed information to User Equipment (UE) in a downlink direction; wherein the RN comprising a receiving unit, configured to receive and forward a light signal from the VS to a first baseband processing unit, wherein the light signal is for transmitting the information;

the first baseband processing unit, configured to decode the received light signal to obtain the information and forward the information to a processor for processing;

the processor, configured to forward the information to a second baseband processing unit;

the second baseband processing unit, configured to code the received information to obtain an electric signal and forward the electric signal to a light modulation unit;

the light modulation unit, configured to convert the received electric signal into a light signal and forward the light signal to a sending unit; and the sending unit, configured to forward the received light signal to the UE, wherein the received light signal is for transmitting the information;

the RN further comprising a data buffer unit, configured to interact with the processor and buffer a high-speed information flow from the processor; and the processor is further configured to provide the high-speed information flow among information flows for the data buffer unit for buffering when detecting that information flow transmission rates of a transmission link between the UE and the RN and a transmission link between the RN and the VS are different, and configured to extract the high-speed information flow from the data buffer unit and forward the high-speed information flow to the second baseband processing unit when detecting that the transmission link with higher information flow transmission rate is idle.

* * * * *